(12) United States Patent
Sugiyama (10) Patent No.: US 6,327,306 B1
(45) Date of Patent: *Dec. 4, 2001

(54) INTERLACED MOVING IMAGE SIGNAL CODING/DECODING APPARATUS AND METHOD, AND STORAGE MEDIUM FOR STORING CODED INTERLACED MOVING IMAGE SIGNAL

(75) Inventor: Kenji Sugiyama, Yokosuka (JP)

(73) Assignee: Victor Company of Japan, Ltd., Yokohama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,316

(22) Filed: Oct. 10, 1997

(30) Foreign Application Priority Data

Oct. 11, 1996 (JP) ................................................ 8-289163

(51) Int. Cl.[7] ................................................ H04N 07/18
(52) U.S. Cl. ................................................ 375/240.21
(58) Field of Search ............................ 348/845.1, 845.2, 348/845.3, 441, 443, 445, 424, 425, 409, 411, 384, 405, 413; 375/240.21

(56) References Cited

U.S. PATENT DOCUMENTS

| | | | |
|---|---|---|---|
| 4,611,225 | * 9/1986 | Powers | 348/443 |
| 5,337,089 | 8/1994 | Fisch | 348/446 |
| 5,438,368 | * 8/1995 | Hutter | 348/434 |
| 5,508,746 | * 4/1996 | Lim | 348/429 |
| 5,594,552 | * 1/1997 | Fujinami et al. | 348/446 |
| 5,737,020 | * 4/1998 | Hall et al. | 348/403 |
| 5,754,248 | * 5/1998 | Faroudja | 348/441 |
| 5,801,777 | * 9/1999 | Lyu | 348/409 |
| 5,844,617 | * 12/1998 | Faroudja et al. | 348/441 |
| 5,859,660 | * 1/1999 | Perkins et al. | 348/845.2 |
| 5,940,141 | * 8/1999 | Faroudja et al. | 348/628 |

FOREIGN PATENT DOCUMENTS

| | | |
|---|---|---|
| 0608092A2 | 7/1994 | (EP) . |
| 03132278 | 6/1991 | (JP) . |

* cited by examiner

Primary Examiner—Andy Rao
(74) Attorney, Agent, or Firm—Jacobson Holman, PLLC (57) ABSTRACT

Scanning lines decimated from an interlaced image signal are interpolated to convert the interlaced image signal into a first progressive image signal. The first progressive image signal is sub-sampled in a vertical direction to obtain a second progressive image signal with scanning lines less than scanning lines of the first progressive image signal. And, the second progressive image signal is coded to obtain a compressed code train (bit stream). The compressed code train can be stored in a storage medium. The code train is decoded to reproduce the second progressive image signal. And, an image format of the second progressive image signal is converted in a vertical direction into another format in which scanning lines are decimated to reproduce the interlaced image signal.

11 Claims, 7 Drawing Sheets

INTERLACED MOVING IMAGE SIGNAL CODING/DECODING APPARATUS AND METHOD, AND STORAGE MEDIUM FOR STORING CODED INTERLACED MOVING IMAGE SIGNAL

BACKGROUND OF THE INVENTION

The present invention relates to an apparatus and a method for coding/decoding a moving image (picture) and a storage medium for storing code trains (bit stream) of the moving image. Particularly, this invention relates to such an apparatus and a method, and a storage medium for processing and storing an interlaced image signal.

In coding of a moving image, an interlaced image signal is deviated in position of scanning lines per field. Therefore, inter-image prediction and intra-image coding with respect to the interlaced image signal need be devised as compared with the case of a non-interlaced image signal.

As the procedure for coding an interlaced image signal, there are some coding systems which have already been standardized.

The J. 81 system of ITU-R is a system in which a field is used as a fundamental processing unit, and inter-image predication is adaptively switched between inter-frame and interfield prediction.

MPEG2 and DVC are another system in which a frame is used as a fundamental processing unit, and processing per field and frame unit are switched in finer macro block unit.

An example of a coding apparatus and decoding apparatus for the interlaced image described above is shown in FIG. 1.

Figure 1:
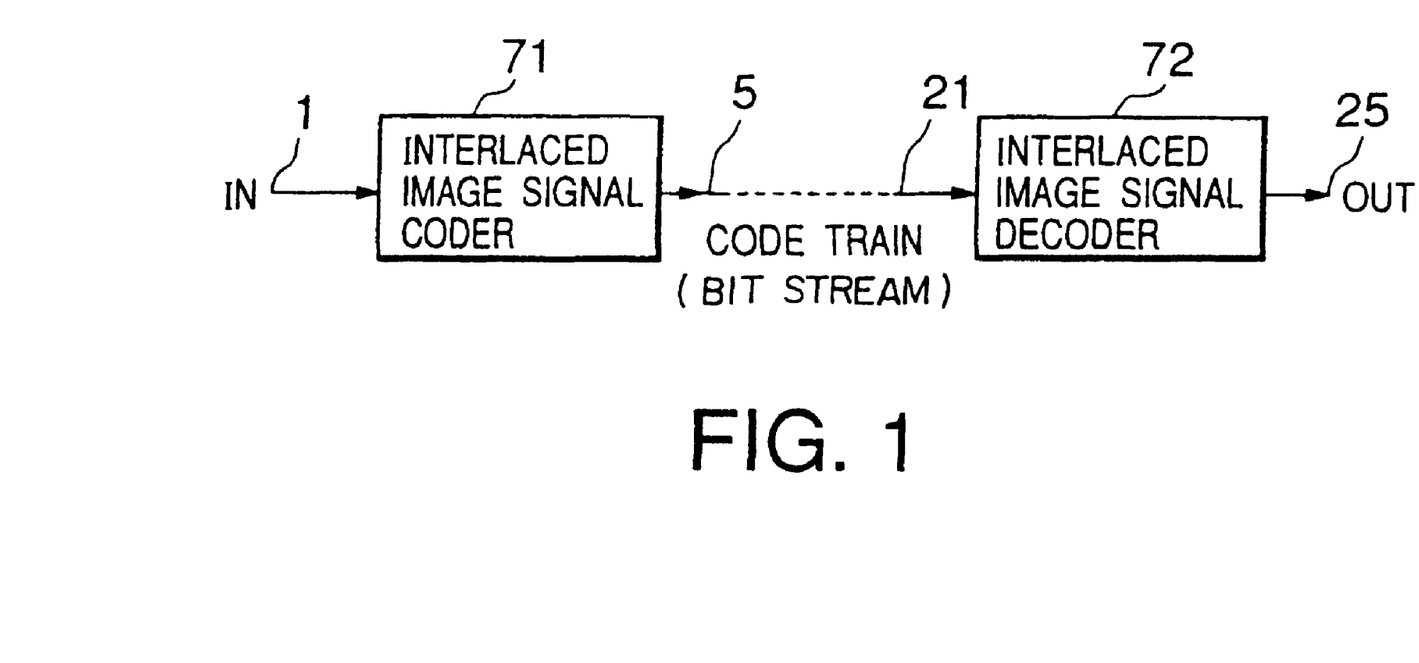
FIG. 1 is a view showing a conventional moving image coding and decoding apparatus.

In FIG. 1, an interlaced image signal input via input terminal 1 is coded and compressed by an interlaced image coder 71 into a code train. The code train (bit stream) is supplied to an interlaced image decoder 72.

The interlaced image decoder 72 is paired with the interlaced image coder 71, to reproduce the interlaced image signal that is output via output terminal 25.

Further, there has been contemplated, as disclosed in Japanese Patent Laid-Open No. 3(1991)-132278 (Japanese Patent Application No. 1(1989)-271006 entitled "VIDEO SIGNAL TRANSFORM APPARATUS", a method for converting an interlaced image signal of 60 fields per second into an interlaced image signal of 30 frames per second to provide non-interlaced image coding.

However, in this case, a violent flicker occurs when 30 frames per second are displayed on a display apparatus as they are. Therefore, one frame is divided into two fields to obtain 60 fields per second before display. The coding system used here is a non-interlaced coding system like MPEG1.

In the case of an image of low resolution in a system, such as, MPEG1, only one of two fields of an interlaced image signal is used while the other is cancelled, to obtain a non-interlaced image signal of 30 frames per second to be coded.

Further, as an image format, there has been known a progressive image of 60 frames per second. This is called a sequential scanning because scanning lines are present also on scanning line portions decimated in an interlaced image. The fundamental scanning line construction of the progressive image is the same as that of the non-interlaced image, which can be regarded as a high frame rate non-interlaced signal.

The progressive image signal can be displayed on a display apparatus without flicker but a horizontal deflection frequency or a video signal band is doubled. Thus, the progressive image signal cannot be displayed on a usual television. As the coding system, a non-interlaced coding system like MPEG1 can be employed. However, double processing speed is necessary because the progressive image has 60 frames per second.

The coding efficiency in the case where an image of each format is coded, that is, a necessary information amount (bit) per pixel will suffice to be the least in the progressive image of 60 frames per second, next in the non-interlaced image of 30 frames per second, and the interlaced image requires the largest number of codes.

The coding efficiency of the interlaced image is poor due to the presence of an aliasing component included in each field image. As viewed from the field, the interlaced image is not applied with vertical filtering fulfilled with a sampling theorem and includes many aliasing components.

In the case where an image is moving, the interlaced image can be processed by motion compensation in inter-field prediction. However, the folded distortion tends to change per field so that the prediction is not precise to lower the coding efficiency. The coding efficiency is further lowered due to high frequency components increase in the intra-picture processing.

On the other hand, in the case of the progressive moving image of 60 frames per second and the non-interlaced moving image of 30 frames per second, the difference therebetween lies only in the frame rate. Either of the image of higher frame rate involves a closer distance between frames in time with less image change between frames. This results in precise inter-image prediction to enhance the coding efficiency. With respect to the intraframe coding, no difference is present between the progressive and the non-interlaced images.

Further, in case of interlaced image signal coding, the coding efficiency is not enhanced in the processing per field. Because the field image or the predictive residue includes many aliasing components. Even in the frame/field adaptive prediction, quick images are subjected to the field processing and the situation is similar to that described above.

As described above, the interlaced signal is inferior in the coding efficiency to the non-interlaced signal. Further, when the interlaced signal of 60 fields per second is converted into the non-interlaced signal of 30 frames per second, the movement of a reproduced image is not smooth as compared with an original interlaced image.

SUMMARY OF THE INVENTION

An object of the present invention to provide a moving image coding apparatus and method for coding an interlaced image signal by progressive coding after it is converted into a progressive image signal to achieve a high coding efficiency, a decoding apparatus and method for decoding the progressive-coded signal to reproduce the original interlaced image signal, and a storage medium storing the image signal obtained by the coding apparatus.

The present invention provides a coding apparatus comprising: a progressive converter to interpolate scanning lines decimated from an input interlaced image signal to convert the interlaced image signal into a first progressive image signal; a sub-sampler to sub-sample the first progressive image signal in a vertical direction to obtain a second progressive image signal with scanning lines less than scanning lines of the first progressive image signal; and a coder to encode the second progressive image signal to obtain a compressed code train.

Further, the present invention provides a decoding apparatus comprising: a decoder to decode an input code train produced by progressive coding to obtain a first progressive image signal; and an image format converter to convert an image format of the first progressive image signal in a vertical direction into another format in which scanning lines are decimated to obtain an interlaced image signal.

Further, the present invention provides a coding and decoding apparatus comprising: a progressive converter to interpolate scanning lines decimated from an input interlaced image signal to convert the interlaced image signal into a first progressive image signal; a sub-sampler to sub-sample the first progressive image signal in a vertical direction to obtain a second progressive image signal with scanning lines less than scanning lines of the first progressive image signal; a coder to encode the second progressive image signal to obtain a compressed code train; a decoder to decode the code train to reproduce the second progressive image signal; and an image format converter to convert an image format of the second progressive image signal in a vertical direction into another format in which scanning lines are decimated to reproduce the interlaced image signal.

Further, the present invention provides a coding method comprising the steps of: interpolating scanning lines decimated from an input interlaced image signal to convert the interlaced image signal into a first progressive image signal; sub-sampling the first progressive image signal in a vertical direction to obtain a second progressive image signal with scanning lines less than scanning lines of the first progressive image signal; and coding the second progressive image signal to obtain a compressed code train.

Further, the present invention provides a decoding method comprising the steps of: decoding an input code train produced by progressive coding to obtain a first progressive image signal; and converting an image format of the first progressive image signal in a vertical direction into another format in which scanning lines are decimated to obtain an interlaced image signal.

Further, the present invention provides a coding and decoding method comprising the steps of: interpolating scanning lines decimated from an input interlaced image signal to convert the interlaced image signal into a first progressive image signal; sub-sampling the first progressive image signal in a vertical direction to obtain a second progressive image signal with scanning lines less than scanning lines of the first progressive image signal; coding the second progressive image signal to obtain a compressed code train; decoding the code train to reproduce the second progressive image signal; and converting an image format of the second progressive image signal in a vertical direction into another format in which scanning lines are decimated to reproduce the interlaced image signal.

Further, the present invention provides a storage medium storing a compressed code train that is obtained by interpolating scanning lines decimated from an interlaced image signal to convert the interlaced image signal into a first progressive image signal, sub-sampling the first progressive image signal in a vertical direction to obtain a second progressive image signal with scanning lines less than scanning lines of the first progressive image signal, and coding the second progressive image signal to obtain the compressed code train.

DESCRIPTION OF PREFERRED EMBODIMENTS

An embodiment of an image coding apparatus according to the present invention will be described hereinafter with reference to the drawings.

Figure 2:
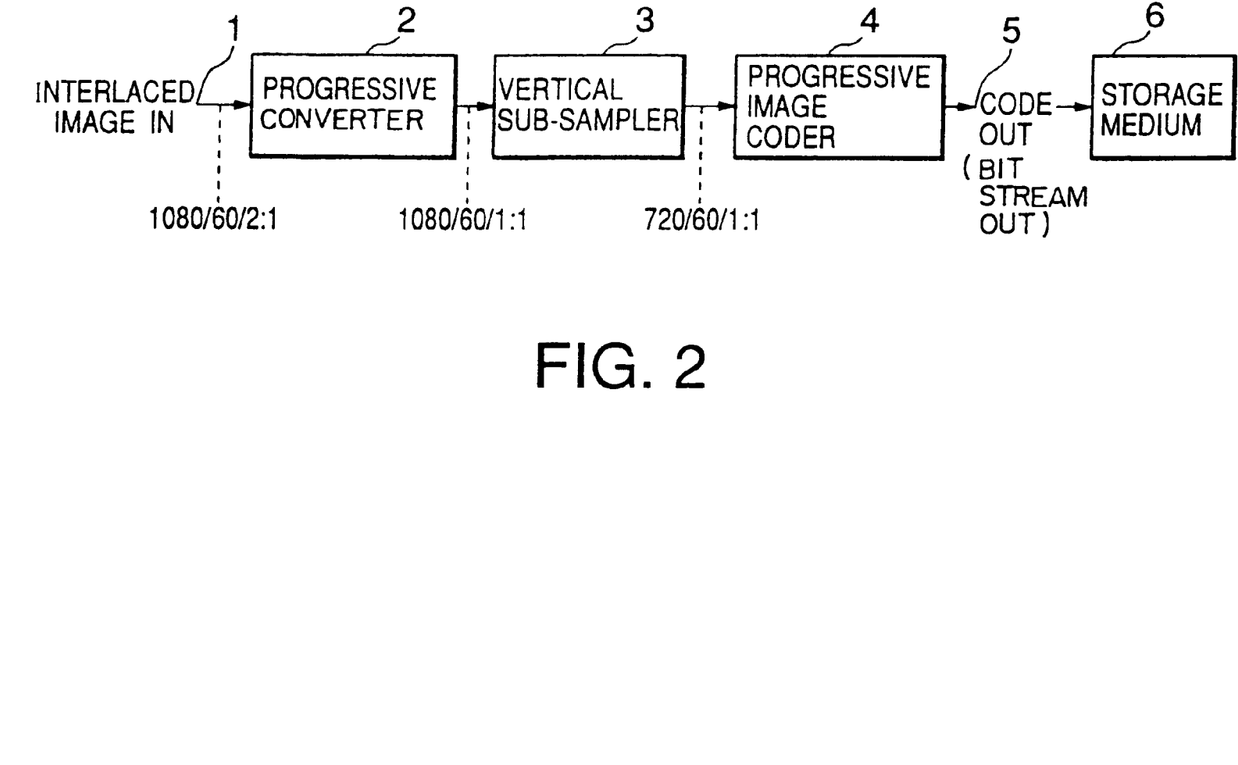
FIG. 2 is a block diagram showing an embodiment of an image coding apparatus according to the present invention.

FIG. 2 is a block diagram showing the embodiment of the image coding apparatus. An interlaced image signal input via input terminal 1 is supplied to a progressive converter 2. In the embodiment, the interlaced image signal involves 1080 (per frame), or 540 (per field) effective scanning lines.

Numerals expressed below the block diagram in FIG. 2, such as, 1080/60/2:1 indicate the number of effective scanning lines/frame(field) rate/interlacing ratio, respectively. Therefore, 60/2:1 indicates an interlaced image, and 60/1:1 indicates a progressive image.

The progressive converter 2 converts the input interlaced image signal into a first progressive image signal with sequential scanning lines of multiple density by motion compensating interpolation processing to the scanning lines that have been made less in number by decimation in the input interlaced image signal. The first progressive image signal involves 60 frames per second, each having 1080 scanning lines. Such a progressive converter is disclosed in "Study of Sequential Scanning and Transform Method using Moving Compensation and Apparatus thereof" by Television Society, Technical Report BCS93-70.

The first progressive image signal is subjected to sub-sampling by a vertical sub-sampler 3. The scanning lines of the first progressive image signal are sub-sampled by ⅔ to be a second image signal with 720 scanning lines.

The sub-sampling is a general technique in image format conversion. The ⅔ sub-sampling is achieved by switching digital filters having three different tap factors.

The second progressive image signal is coded by a progressive image coder 4. The progressive image coding is executed by raising the coding frame rate to 60 frames/second corresponding to the non-interlaced signal coding in MPEG1.

When this invention is applied to MPEG2, the progressive image coder 4 may not be needed because MPEG2 is capable of progressive image coding.

In this way, a code train (bit stream) with the compressed second progressive image signal is obtained and output via output terminal 5. The output code train (bit stream) is transmitted to a decoding apparatus described below through a transmission line not shown. Or, it is stored in a digital storage medium shown in FIG. 2, such as, a disc and a magnetic tape, also not shown.

Figure 3:
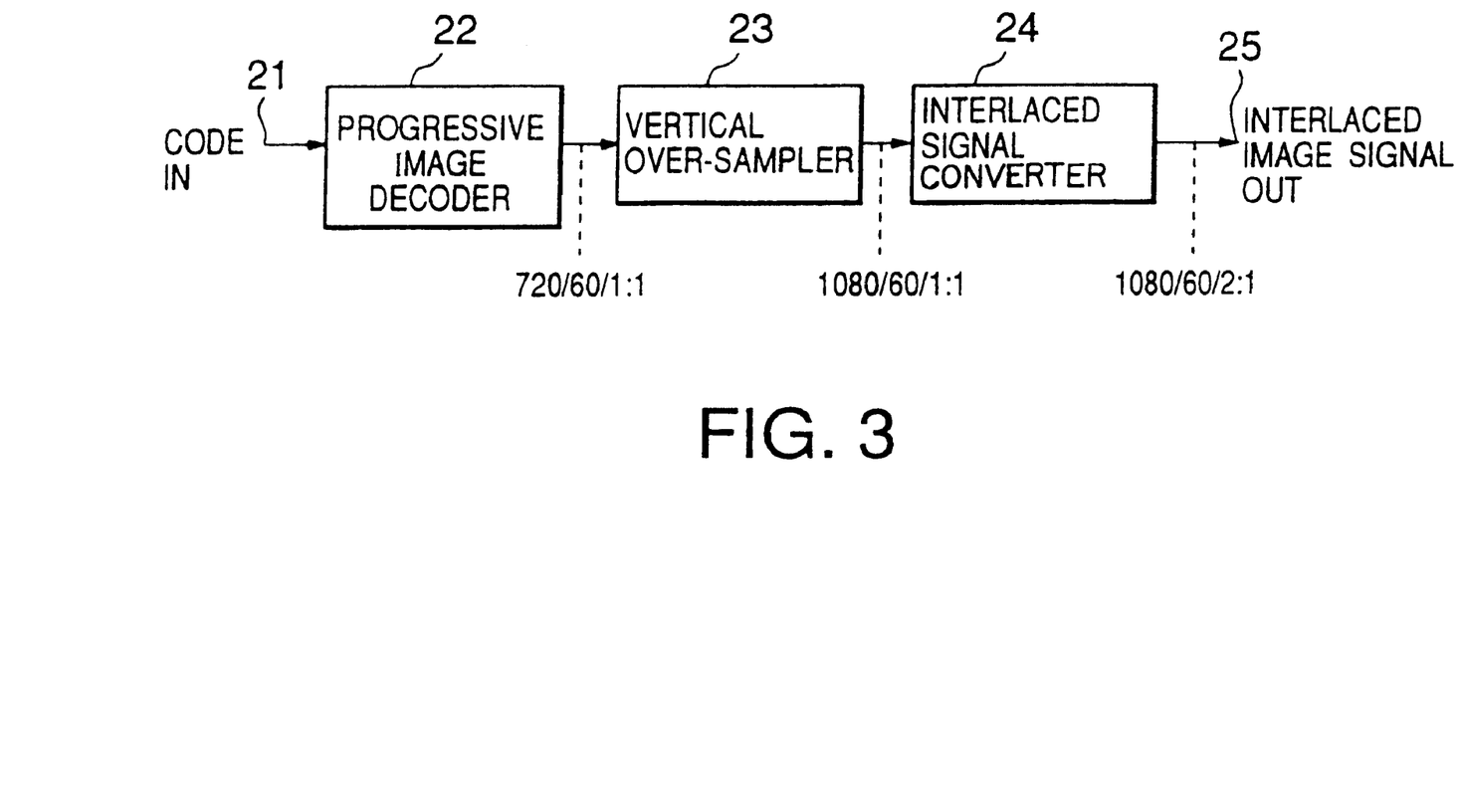
FIG. 3 is a block diagram showing an embodiment of an image decoding apparatus according to the present invention.

FIG. 3 is a view showing an embodiment of an image decoding apparatus according to the present invention.

The code train (bit stream) output from the coding apparatus shown in FIG. 2 is supplied to a progressive image decoder 22 via input terminal 21. The progressive image decoder 22 reproduces the second progressive image signal by reducing the number of the scanning lines of the input code train (bit stream).

The reproduced second progressive image signal is supplied to a vertical over-sampler 23 to reproduce the first progressive image signal having the original scanning lines before coded by the coding apparatus shown in FIG. 2.

The reproduced first progressive image signal is supplied to an interlaced signal converter 24. The converter 24 simply decimates the scanning lines of the reproduced first progressive image signal to reproduce the interlaced image signal that has been input to the coding apparatus shown in FIG. 2. The reproduced interlaced image signal is output via output terminal 25.

Here, the vertical over-sampler 23 may be configured so as not to generate scanning lines which are to be decimated and erased by the interlaced signal converter 24. This processing is one kind of the image format conversion. And, in this processing, every other scanning line is generated by the vertical over-sampler 23 to generate the interlaced image signal that is identical to that reproduced by the interlaced signal converter 24. In this case, the processing of the vertical over-sampler 23 is halved and the interlaced signal converter 24 is not needed.

Figure 4:
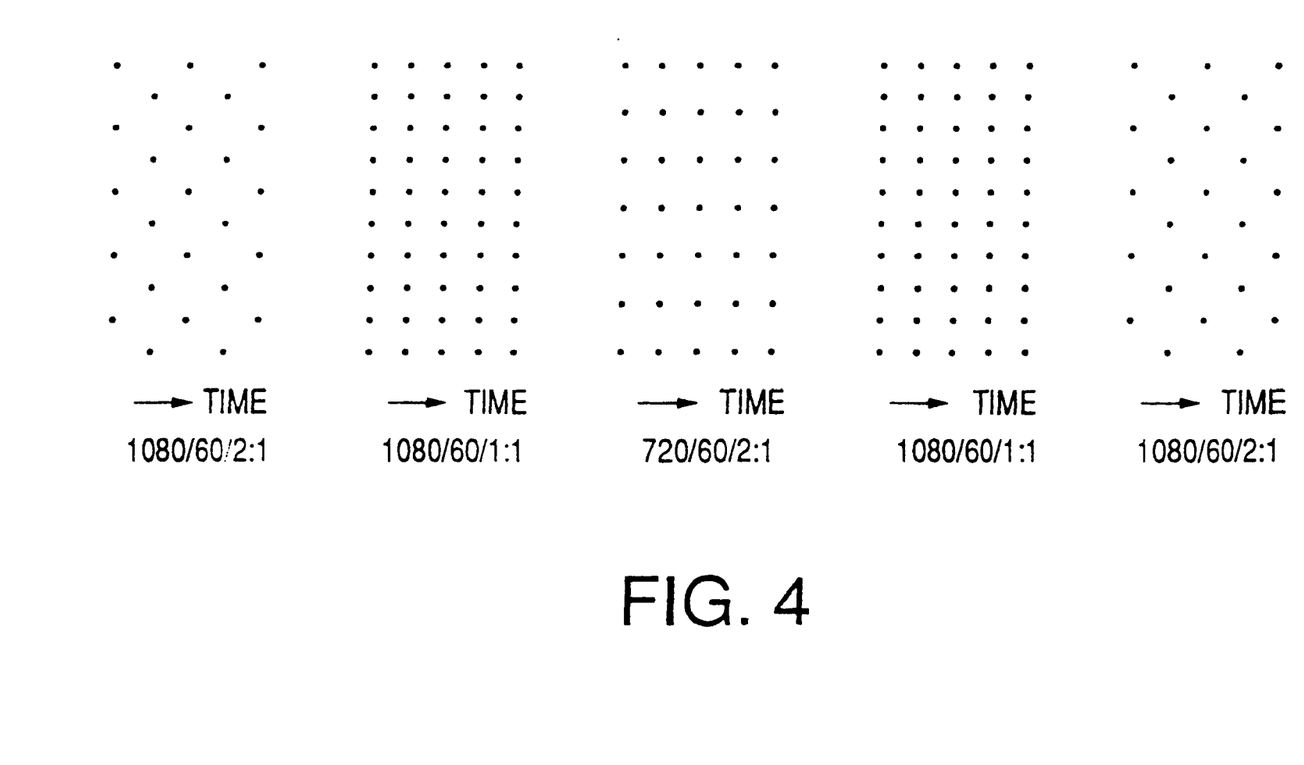
FIG. 4 illustrates image formats in respective processing stages according to the present invention.

FIG. 4 shows the transition of image format in the processing stages of a series of coding and decoding as described above with reference to FIGS. 2 and 3. The vertical direction shown in FIG. 4 is the vertical direction of the image processed by the coding and decoding apparatus of FIGS. 2 and 3. And, the horizontal direction indicates the change in time. Each dot represents a scanning line.

In the description above, the image signal processed by the coding and decoding apparatus shown in FIGS. 2 and 3 is the interlaced image signal. However, a progressive image signal also can be processed by the coding and decoding apparatus shown in FIGS. 2 and 3. In this case, an input progressive image signal is directly supplied to the progressive image coder 4 in FIG. 2. The output signal is identical to that output via output terminal 5 of the coding apparatus of FIG. 2 as described above.

Therefore, in the present invention, the output compressed code trains (bit streams) are identical to each other whether the image signal input to the coding apparatus shown in FIG. 2 is the interlaced signal or the progressive image signal.

Further, in the decoding apparatus shown in FIG. 3, when a display apparatus capable of displaying a progressive image is connected to the output terminal 25 of the decoding apparatus, the output signal of the progressive image decoder 22 or the vertical over-sampler 23 may be directly output via output terminal 25.

In this way, in the present invention, the interchangeability can be improved between the interlaced and the progressive image signals.

The sampling ratio in the vertical sampler 2 will be studied hereinafter.

The interlaced image signal involves the same number of scanning lines as that of the non-interlaced image (progressive image) signal per frame. However, since the scanning lines of the interlaced image signal are decimated, a vertical resolution equal to the non-interlaced image signal cannot be obtained in the interlaced image signal. If the interlaced image signal is provided with a vertical high frequency component, this frequency component will not be displayed on a display apparatus as a high frequency component in the vertical direction but it will be an aliasing component and displayed as a high frequency component in the time direction to produce a violent line flicker.

Usually, a TV camera for an interlaced image signal limits the frequency band of a generated interlaced image signal optically or electrically to output an image signal with a vertically suppressed high frequency component as an interlaced image signal.

A degree of the frequency band limit is called the Kell factor, and is usually about 0.7.

Accordingly, an interlaced image signal converted into a progressive image signal by scanning line interpolation will be in the state limited in frequency band in the vertical direction.

Thus, in the present invention, the number of scanning lines of the first progressive image signal output by the progressive converter 2 is reduced to match the Kell factor by sub-sampling processing of the vertical sub-sampler 3. Since a signal component is naturally not present in a signal band to be lost by the sub-sampling, no defect of information occurs.

On the other hand, in the second progressive image signal having the number of scanning lines reduced by sub-sampling processing of the vertical sub-sampler 3, there is present signal components without vacancy within the band.

Figure 5A:
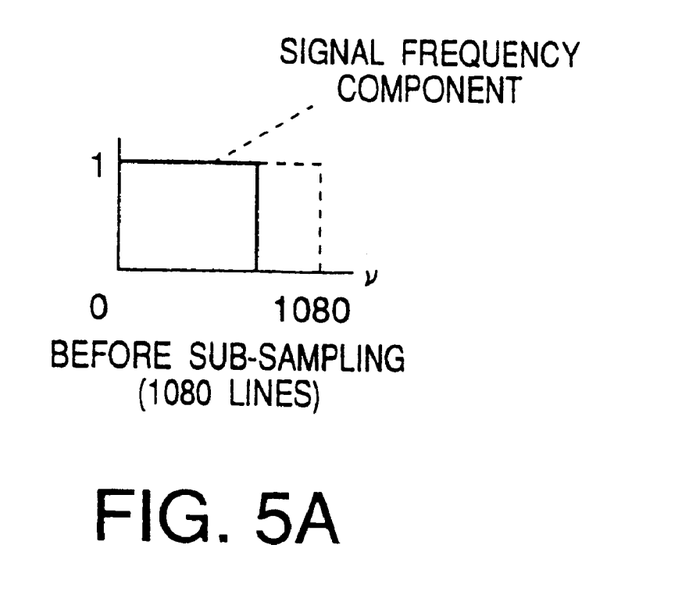
FIGS. 5A and 5B are views showing the frequency characteristics before and after sub-sampling according to the present invention.
Figure 5B:
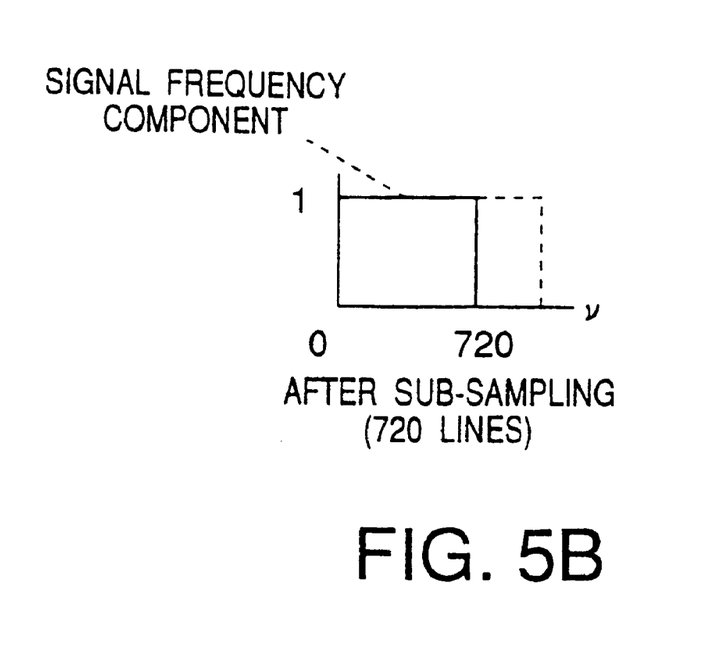

FIGS. 5A and 5B show the frequency characteristics of the first progressive signal (before sub-sampling) and the second progressive signal (after sub-sampling). In the figures, the solid line indicates portions where the signal frequency components are actually present, and the dotted line indicates a transmissible band given by the sampling theorem. FIG. 5B shows that the signal frequency components actually present and the transmissible band given by the sampling theorem are identical to each other after sub-sampling.

The sub-sampling ratio often takes an integer that ranges from $2/3$ (=0.667) to $3/4$ (=0.75), for example, for convenience in scanning line transforming. In the present embodiment, as already described above, $2/3$ (=0.667) is employed as the sub-sampling ratio.

The MPEG coding used in the present invention has different frame (picture) types, I, P and B, due to the difference in processing between images. The I frame (picture) is a frame independently coded in one frame, P is a one-directional predictive-coded frame and B is a bi-directional predictive-coded frame.

Figure 6:
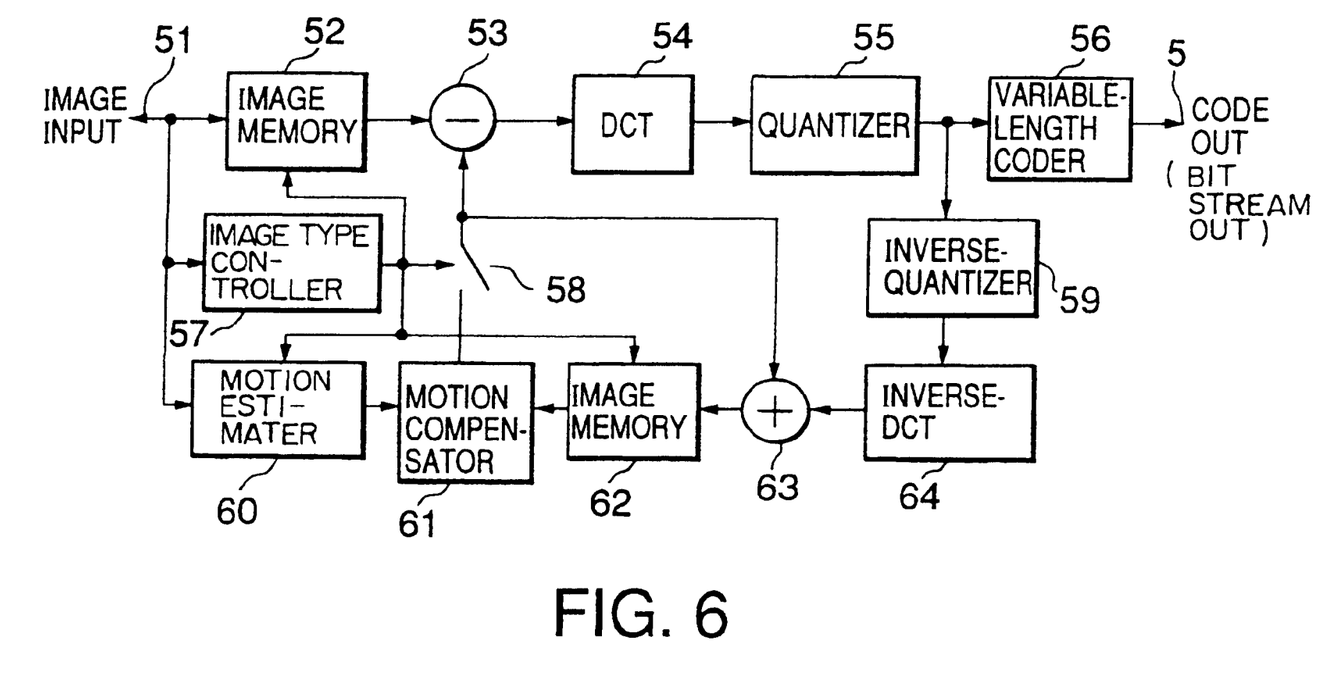
FIG. 6 is a block diagram showing a progressive image coder according to the present invention.

FIG. 6 shows an example of the block diagram of the progressive image coder 4 shown in FIG. 2.

Image signals (second progressive image signals) each composed of a frame output from the vertical sub-sampler 3 shown in FIG. 2 are sequentially stored in an image memory 52 via input terminal 51. Frames involved in the input image signals are replaced in accordance with the coding order and are supplied to a predictive signal subtracter 53.

The predictive signal subtracter 53 subtracts a predictive signal described later from one input image signal (one frame) to produce a predictive residue signal that is supplied to a discrete cosine transformer (DCT) 54. The transformer 54 performs discrete cosine transform to transform the predictive residue signal in pixel unit of 8×8 into coefficients that are supplied to a quantizer 55.

The coefficients are quantized by the quantizer 55 into fixed-length codes that are supplied to a variable-length coder 56 and an inverse-quantizer 59.

A code train of variable-length codes converted from the fixed-length codes by the variable-length coder 56 is output via output terminal 5.

The coefficients (the fixed-length codes) are reproduced by the inverse-quantizer 59 by replacing the quantized coefficients with representative values. The reproduced coefficients are supplied to an inverse discrete cosine transformer (DCT) 64 that performs the inverse processing of the discrete cosine transformer 54. The reproduced coefficients are then transformed into a reproductive residue signal that is supplied to a predictive signal adder 63.

The predictive signal adder 63 adds the predictive signal and the reproductive residue signal to reproduce the image signal that is supplied to an image memory 62. An output of the image memory 62 is supplied to a motion compensator 61 and motion-compensated in accordance with motion vector information described later. The motion-compensated image signal is supplied to a switch 58 as the predictive signal. The motion compensation is simple without switching between field and frame processing, unlike the interlaced image coder 71 shown in FIG. 1.

The switch 58 operates such that, in the P and B frames, the predictive signal is supplied to the predictive signal subtracter 53 and the predictive signal adder 63, while in the I frame, the value zero is supplied thereto, in accordance with a control signal from an image type controller 57.

The image memories 52 and 62 replace frames according to the coding order depending on whether the input image signal is a P or B frame in accordance with the control signal from the image type controller 57.

The motion vector information is obtained from the input image signal by a motion estimater 60 in accordance with the input frame type.

The image type controller 57 counts input frames whereby one frame out of a few frames is decided as a P frame, and one out of scores of frames is decided as an I frame. Most generally, the interval between two P frames is usually 3 frames, but in the present invention, there are used 2, 4 and 6 frames that are a multiple of 2 for the reasons mentioned below.

In the MPEG coding system as described, a P frame is subjected to a recursive prediction in which a reproduced image is used for other frame predictions, and B frame is subjected to a non-recursive prediction in which a reproduced image is not used for prediction.

Thus, when quality of the P frame is made higher than the B frame, the entire image quality can be improved. To this end, an image of a P frame should not be changed so that P frame interframe prediction can be carried out adequately.

However, in the progressive image signal obtained by the progressive converter 2 shown in FIG. 2, a positional relation between an original input scanning line and an interpolated scanning line is reversed depending on whether an original input field is an even-number or odd-number field.

That is, the scanning line construction is the same in frames but the interpolation is not completely carried out. Therefore, the image itself of each frame is somewhat different depending on the original fields.

Thus, the frames composed of the same type of fields processed by the progressive converter 2 shown in FIG. 2 are decided to be P frames by the image type controller 57 shown in FIG. 6. This is achieved by synchronizing the interval between two P frames with the interlacing ratio (usually, two). More specifically, it will be an integer fold (for example, 2, 4, 6) of the interlacing ratio.

Figure 7:
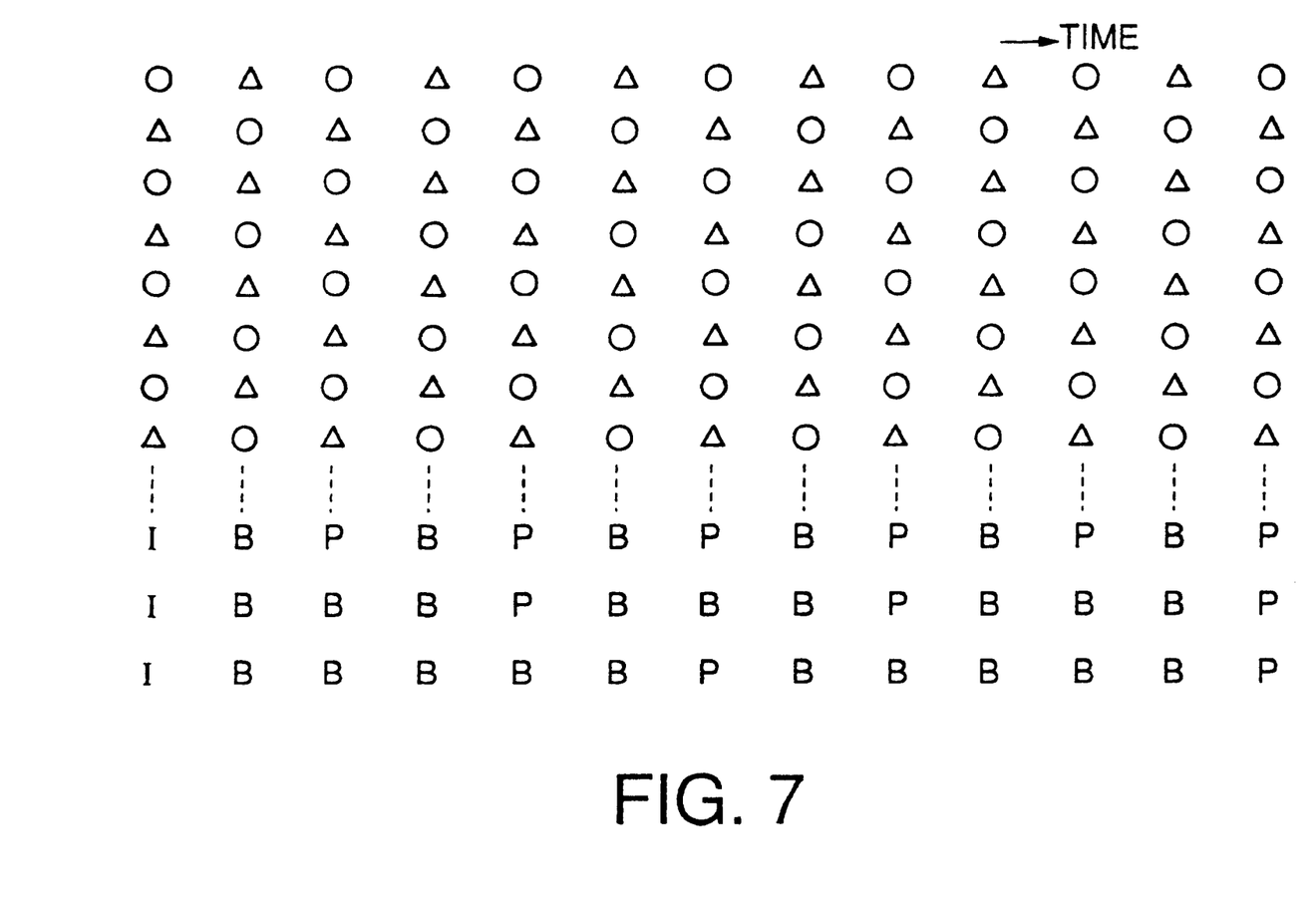
FIG. 7 is a view showing image types in the MPEG coding according to the present invention.

FIG. 7 schematically shows the frame types decided by the frame type controller 57 shown in FIG. 6 in the case of MPEG coding.

In FIG. 6, a symbol ○ indicates a scanning line present from the original image signal input to the coding apparatus of FIG. 2 and a symbol Δ a scanning line interpolated by the progressive converter 2 of FIG. 2. Indicated under the symbols are image types of frames where the upper stage indicates that a P frame is set per 2 frames, the middle stage 4 frames and the lower stage 6 frames.

Accordingly, P frames will always be frames composed of even number- or odd number-fields, being hard to be affected by the interpolation processing of the progressive converter 2 where the interpolation may be somewhat different in even number- or odd number-fields.

According to the present invention, the number of scanning lines is reduced after an interlaced image has been converted into a progressive image, and the image is subjected to the progressive coding whereby the image of the frame is always coded. This eliminates aliasing components of field images that have posed a problem in the conventional interlaced image coding, thus enabling obtaining a high coding efficiency.

Further, according to the present invention, since the number of scanning lines is reduced, the processing amount with respect to the coding of images subjected to the progressive conversion is made less and so the code amount is reduced.

Further, according to the present invention, the conversion ratio of the number of scanning lines by the subsampling is adjusted to the Kell factor whereby coding can be performed without defecting image information of input interlaced signal.

Furthermore, according to the present invention, the interval of one-directional interframe prediction is made to be an integer fold of the interlacing ratio in coding whereby frames for the one-directional interframe prediction which is a recursive prediction will always be the frames in the same interpolation state. Therefore, the interframe prediction is not easily affected by the delicate difference between the frames, thus improving the coding efficiency.

As described above, according to the present invention, all the image information originally possessed by the input interlaced image signal can be coded with high efficiency.

Furthermore, an image is input and output in the intermediate processing stage in the present invention whereby it can cope with coding and reproduction of the progressive image. It is therefore possible to process both interlaced and progressive images to obtain a common compressed code, thus greatly improving the interchangeability between both image formats.

What is claimed is:

1. A coding apparatus comprising:
   a progressive converter to interpolate scanning lines decimated from an input interlaced scanning image signal deviated in vertical position of scanning lines per different timing field to convert the interlaced scanning image signal into a first progressive scanning image signal having a frame rate the same as a field rate of the input interlaced scanning image signal, and having the number of frame lines the same as the number of frame lines of the input interlaced scanning image signal;
   a sub-sampler to sub-sample the first progressive scanning image signal in a vertical direction to obtain a second progressive scanning image signal with scanning lines less than scanning lines of the first progressive scanning image signal, a ratio of the number of scanning lines of the second progressive scanning image signal to the number of scanning lines of the first progressive scanning image signal matching the Kell factor of the input interlaced scanning image signal; and a coder to encode the second progressive scanning image signal to obtain a compressed code train.

2. The coding apparatus according to claim 1, wherein the coder comprises:

a predictive coder to encode the second progressive scanning image signal to output variable-length codes;

a compensator to compensate motion of an image signal that is already reproduced after coding processing of the predictive coder to produce a predictive signal; and a controller to control supply of the predictive signal to the predictive coder according to a frame type of the second progressive scanning image signal.

3. A decoding apparatus comprising:

a decoder to decode an input code train produced by progressive coding to obtain a first progressive scanning image signal; and an image format converter to convert an image format of the first progressive scanning image signal in a vertical direction into another format in which scanning lines are decimated to obtain an interlaced scanning image signal, wherein the image format converter comprises:

an over-sampler to over-sample the first progressive scanning image signal in the vertical direction to increase the number of scanning lines of the first progressive scanning image signal to substantially match an over-sampling factor 1.4, to obtain a second progressive scanning image signal with scanning lines more than scanning lines of the first progressive scanning image signal; and a converter to convert the second progressive scanning image signal into the interlaced scanning image signal by decimating the scanning lines of the second progressive scanning image signal, the interlaced scanning image signal being deviated in vertical position of scanning lines per different timing field, a field rate of the interlaced scanning image signal being the same as a frame rate of the second progressive scanning image signal, the number of lines of the interlaced scanning image signal being the same as the number of frame lines of the second progressive scanning image signal.

4. A coding and decoding apparatus comprising:

a progressive converter to interpolate scanning lines decimated from an input interlaced scanning image signal deviated in vertical position of scanning lines per different timing field to convert the interlaced scanning image signal into a first progressive scanning image signal having a frame rate the same as a field rate of the input interlaced scanning image signal, the number of frame lines of the first progressive scanning image signal being the same as the number of frame lines of the input interlaced scanning image signal;

a sub-sampler to sub-sample the first progressive scanning image signal in a vertical direction to obtain a second progressive scanning image signal with scanning lines less than scanning lines of the first progressive scanning image signal, a ratio of the number of scanning lines of the second progressive scanning image signal to the number of scanning lines of the first progressive scanning image signal matching the Kell factor of the input interlaced scanning image signal;

a coder to encode the second progressive scanning image signal to obtain a compressed code train;

a decoder to decode the code train to reproduce the second progressive scanning image signal; and an image format converter to convert an image format of the second progressive scanning image signal in the vertical direction into another format in which scanning lines are decimated to reproduce the interlaced scanning image signal, wherein the image format converter comprises:

an over-sampler to over-sample the second progressive scanning image signal in the vertical direction to increase the number of scanning lines of the second progressive scanning image signal to substantially match an over-sampling factor 1.4, to reproduce the first progressive scanning image signal with scanning lines more than scanning lines of the second progressive scanning image signal; and a converter to convert the reproduced first progressive scanning image signal into the interlaced scanning image signal by decimating the scanning lines of the reproduced first progressive scanning image signal.

5. A coding method comprising the steps of:

interpolating scanning lines decimated from an input interlaced scanning image signal deviated in vertical position of scanning lines per different timing field to convert the interlaced scanning image signal into a first progressive scanning image signal having a frame rate the same as a field rate of the input interlaced scanning image signals and the number of frame lines the same as the number of frame lines of the input interlaced scanning image signal;

sub-sampling the first progressive scanning image signal in a vertical direction to obtain a second progressive scanning image signal with scanning lines less than scanning lines of the first progressive scanning image signal, a ratio of the number of scanning lines of the second progressive scanning image signal to the number of scanning lines of the first progressive scanning image signal matching the Kell factor of the input interlaced scanning image signal; and coding the second progressive scanning image signal to obtain a compressed code train.

6. The coding method according to claim 5, wherein the coding step comprises the steps of:

coding the second progressive scanning image signal to output variable-length codes;

compensating motion of an image signal that is already reproduced after coding processing to output the variable-length codes to produce a predictive signal; and controlling supply of the predictive signal for the coding processing to output the variable-length codes according to a frame type of the second progressive scanning image signal.

7. A decoding method comprising the steps of:

decoding an input code train produced by progressive coding to obtain a first progressive scanning image signal;

over-sampling the first progressive scanning image signal in a vertical direction to increase the number of scanning lines of the first progressive scanning image signal to substantially match an over-sampling factor 1.4, to obtain a second progressive scanning image signal with scanning lines more than scanning lines of the first progressive scanning image signal; and converting an image format of the first progressive scanning image signal in the vertical direction into another format in which scanning lines are decimated to obtain an interlaced scanning image signal by converting the second progressive scanning image signal into the interlaced scanning image signal with decimation of the scanning lines of the second progressive scanning image signal, the interlaced scanning image signal deviated in vertical position of scanning lines per different timing field a field rate of the interlaced scanning image signal being the same as a frame rate of the second progressive scanning image signal, the number of frame lines of the interlaced scanning image signal being the same as the number of frame lines of the second progressive scanning image signal.

8. A coding and decoding method comprising the steps of:

interpolating scanning lines decimated from an input interlaced scanning image signal deviated in vertical position of scanning lines per different timing field to convert the interlaced scanning image signal into a first progressive scanning image signal having a frame rate the same as a field rate of the input interlaced scanning image signal, and having the number of frame lines the same as the number of frame lines of the input interlaced scanning image signal;

sub-sampling the first progressive scanning image signal in a vertical direction to obtain a second progressive scanning image signal with scanning lines less than scanning lines of the first progressive scanning image signal, a ratio of the number of scanning lines of the second progressive scanning image signal to the number of scanning lines of the first progressive scanning image signal matching the Kell factor of the input interlaced scanning image signal;

coding the second progressive image signal to obtain a compressed code train;

decoding the code train to reproduce the second progressive scanning image signal;

over-sampling the second progressive scanning image signal in the vertical direction to increase the number of scanning lines of the second progressive scanning image signal to substantially match an over-sampling factor 1.4, to reproduce the first progressive scanning image signal with scanning lines more than scanning lines of the second progressive scanning image signal; and converting an image format of the second progressive scanning image signal in the vertical direction into another format in which scanning lines are decimated to reproduce the interlaced scanning image signal by converting the reproduced first progressive scanning image signal into the interlaced scanning image signal with decimation of the scanning lines of the reproduced first progressive scanning image signal.

9. A storage medium storing a compressed code train that is obtained by interpolating scanning lines decimated from an interlaced scanning image signal deviated in vertical position of scanning lines per different timing field to convert the interlaced scanning image signal into a first progressive scanning image signal having a frame rate the same as a field rate of the input interlaced scanning image signal, and having the number of frame lines the same as the number of frame lines of the input interlaced scanning image signal, sub-sampling the first progressive scanning image signal in a vertical direction to obtain a second progressive scanning image signal with scanning lines less than scanning lines of the first progressive scanning image signal, a ratio of the number of scanning lines of the second progressive scanning image signal to the number of scanning lines of the first progressive scanning image signal matching the Kell factor of the input interlaced scanning image signal, and coding the second progressive scanning image signal to obtain the compressed code train.

10. A coding apparatus comprising:

a progressive converter to interpolate scanning lines decimated from an input interlaced scanning image signal deviated in vertical position of scanning lines per different timing field to convert the interlaced scanning image signal into a first progressive scanning image signal;

a sub-sampler to sub-sample the first progressive scanning image signal in a vertical direction to obtain a second progressive scanning image signal with scanning lines less than scanning lines of the first progressive scanning image signal; and a coder to encode the second progressive scanning image signal so that an interval of frames of the second progressive scanning image signal subjected to intraframe coding or one-directional interframe predictive coding is an integer fold of a decimating ratio of the scanning lines of the input interlaced scanning image signal, to obtain a compressed code train.

11. A storage medium storing a compressed code train that is obtained by interpolating scanning lines decimated from an interlaced scanning image signal deviated in vertical position of scanning lines per different timing field to convert the interlaced scanning image signal into a first progressive scanning image signal having a frame rate the same as a field rate of the input interlaced scanning image signal and having the number of frame lines of the input interlaced scanning image signal, sub-sampling the first progressive scanning image signal in a vertical direction to obtain a second progressive scanning image signal with scanning lines less than scanning lines of the first progressive scanning image signal, and coding the second progressive scanning image signal to obtain the compressed code train so that an interval of frames of the second progressive scanning image signal subjected to intraframe coding, one-directional interframe predictive coding or bi-directional interframe predictive coding is an integer fold of a decimating ratio of the scanning lines of the input interlaced scanning image signal.

* * * * *